United States Patent
Chen et al.

(10) Patent No.: US 11,647,482 B2
(45) Date of Patent: May 9, 2023

(54) METHOD AND DEVICE FOR SELECTING GRANT-FREE AND GRANT-BASED UPLINK TRANSMISSION

(71) Applicant: VIVO MOBILE COMMUNICATION CO., LTD., Guangdong (CN)

(72) Inventors: Xiaohang Chen, Chang'an Dongguan (CN); Xueming Pan, Chang'an Dongguan (CN); Wei Bao, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 73 days.

(21) Appl. No.: 16/636,319

(22) PCT Filed: Aug. 6, 2018

(86) PCT No.: PCT/CN2018/099042
§ 371 (c)(1),
(2) Date: Feb. 3, 2020

(87) PCT Pub. No.: WO2019/024940
PCT Pub. Date: Feb. 7, 2019

(65) Prior Publication Data
US 2020/0169987 A1    May 28, 2020

(30) Foreign Application Priority Data

Aug. 4, 2017 (CN) .......................... 201710661850.X

(51) Int. Cl.
*H04W 72/02* (2009.01)
*H04W 72/56* (2023.01)
*H04W 72/53* (2023.01)

(52) U.S. Cl.
CPC .......... *H04W 72/02* (2013.01); *H04W 72/53* (2023.01); *H04W 72/56* (2023.01)

(58) Field of Classification Search
CPC . H04W 72/02; H04W 72/0493; H04W 72/10; H04W 72/1242; H04W 72/56; H04W 72/53
See application file for complete search history.

(56) References Cited

U.S. PATENT DOCUMENTS

2004/0205266 A1    10/2004  Regal et al.
2008/0200196 A1*   8/2008   Muharemovic ....... H04L 1/0086
                                                                       455/512
(Continued)

FOREIGN PATENT DOCUMENTS

CN    1762133 A     4/2006
CN    104683080 A   6/2015
CN    106416141 A   2/2017

OTHER PUBLICATIONS

Interdigital Communications. "Discussion on Multiple Access for New Radio Systems" 3GPP TSG-RAN WG1 Meeting #84bis R1-162922, Apr. 1, 2016.
European Search Report in Application No. 18840276.2 dated Jun. 26, 2020.
CN Office Action in Application No. 201710661850.X dated Jan. 21, 2020.

(Continued)

*Primary Examiner* — Un C Cho
*Assistant Examiner* — Lalita W Pace
(74) *Attorney, Agent, or Firm* — Maschoff Brennan

(57) ABSTRACT

A data transmission method and a device are provided. The data transmission method is applied to a terminal and includes: in the case that both a grant-free resource and a grant-based resource are available for the terminal, choosing, by the terminal, to transmit service data on the grant-free resource preferentially; or choosing, by the terminal, to transmit service data on the grant-based resource preferentially; or choosing dynamically, by the terminal, to transmit service data on the grant-free resource and/or the grant-based resource.

10 Claims, 5 Drawing Sheets

(56) References Cited

U.S. PATENT DOCUMENTS

| | | | |
|---|---|---|---|
| 2014/0376467 A1 | 12/2014 | Liu et al. | |
| 2015/0334599 A1 | 11/2015 | Maaref et al. | |
| 2016/0323911 A1 | 11/2016 | Au et al. | |
| 2018/0092125 A1* | 3/2018 | Sun | H04W 74/02 |
| 2018/0139774 A1* | 5/2018 | Ma | H04W 72/1289 |
| 2018/0176945 A1* | 6/2018 | Cao | H04L 1/1822 |
| 2018/0368117 A1* | 12/2018 | Ying | H04L 5/0044 |
| 2018/0368157 A1* | 12/2018 | Jeon | H04L 5/0044 |
| 2018/0368174 A1* | 12/2018 | Jeon | H04W 72/044 |
| 2019/0357178 A1* | 11/2019 | Bae | H04L 5/0053 |
| 2020/0021976 A1* | 1/2020 | Shimezawa | H04L 1/0063 |
| 2020/0045722 A1* | 2/2020 | Bae | H04W 72/1242 |
| 2020/0077437 A1* | 3/2020 | Stern-Berkowitz | H04W 74/0808 |

OTHER PUBLICATIONS

"LCR TDD: Non-Scheduled Traffic and Scheduled Traffic Transmissions" 3GPP TSG RAN WG1 #46bis, Oct. 9, 2006.
Discussion on multiple access for New Radio systems: 3GPP TSG-RAN WG1 Meeting #84bis, Apr. 11, 2016.
"Relationship between grant-free and grant-based access" 3GPP TSG-RAN WG1 #86bis, Oct. 10, 2016.
"Discussion on UL multiplexing data with different transmission durations" 3GPP TSG RAN WG1 NR Ad-Hoc#2, Jun. 27, 2017.
"Semi-persistent scheduling operation in LTE Rel-9" 3GPP TSG RAN WG2 #66bis, Jun. 29, 2009.
Written Opinion and International Search Report in Application No. PCT/CN2018/099042 dated Feb. 13, 2020.

\* cited by examiner in the case that both a grant-free resource and a grant-based resource are available for the terminal, choosing, by the terminal, to transmit service data on the grant-free resource preferentially; or choosing, by the terminal, to transmit service data on the grant-based resource preferentially; or choosing dynamically, by the terminal, to transmit service data on the grant-free resource and/or the grant-based resource       11

FIG.1

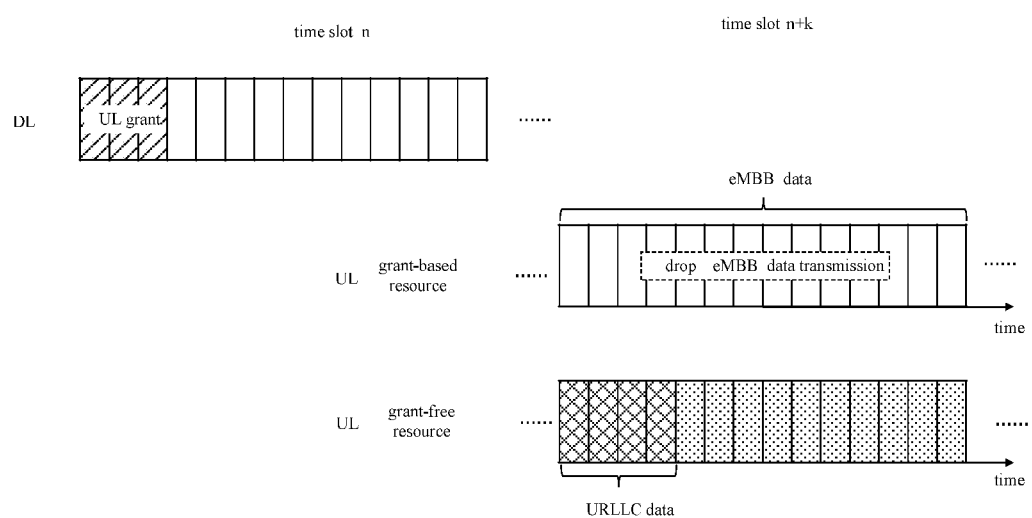

FIG.2

METHOD AND DEVICE FOR SELECTING GRANT-FREE AND GRANT-BASED UPLINK TRANSMISSION

CROSS REFERENCE OF RELATED APPLICATION

The present application is the U.S. national phase of PCT Application PCT/CN2018/099042 filed on Aug. 6, 2018, which claims a priority of Chinese patent application No. 201710661850.X filed on Aug. 4, 2017, which is incorporated herein by reference in its entirety.

TECHNICAL FIELD

The present disclosure relates to the field of radio communication technologies, and in particular, to a data transmission method and a device.

BACKGROUND

Compared with the previous mobile communication systems, the future 5G mobile communication systems need to adapt to more diverse scenarios and business needs. The main scenarios of new radio (NR) include an Enhance Mobile Broadband (eMBB), a Massive Machine Type of Communication (mMTC), and an Ultra-Reliable and Low Latency Communications (URLLC), these scenarios put forward requirements for the system with high reliability, low latency, large bandwidth, and wide coverage. In view of such service requirements, the NR supports the grant-free transmission method to reduce signaling interaction processes and ensure low latency requirements. A User Equipment (UE) may transmit data on grant-free resources. In addition, the terminal may also receive downlink control information to obtain the indicated grant-based resources, and the terminal performs the data transmission on the indicated grant-based resources.

In the related art, in the case that the terminal is configured or instructed with both the grant-free resource and the grant-based resource at the same time, how the terminal selects the resource used for the transmission of service data needs to be further clarified.

SUMMARY

A data transmission method and a device are provided in the embodiments of the present disclosure, to solve the technical issue that how the terminal selects the resource used for the transmission of service data in the case that both the grant-free resource and the grant-based resource are available for the terminal at the same time.

In view of this, in a first aspect, a data transmission method is provided in the embodiments of the present disclosure, applied to a terminal, including: in the case that both a grant-free resource and a grant-based resource are available for the terminal, choosing, by the terminal, to transmit service data on the grant-free resource preferentially; or choosing, by the terminal, to transmit service data on the grant-based resource preferentially; or choosing dynamically, by the terminal, to transmit service data on the grant-free resource and/or the grant-based resource.

In a second aspect, a terminal is provided in the embodiments of the present disclosure, including:

a first transmitting module, configured to, in the case that both a grant-free resource and a grant-based resource are available for the terminal, choose to transmit service data on the grant-free resource preferentially; or a second transmitting module, configured to, in the case that both a grant-free resource and a grant-based resource are available for the terminal, choose to transmit service data on the grant-based resource preferentially; or a third transmitting module, configured to, in the case that both a grant-free resource and a grant-based resource are available for the terminal, choose dynamically to transmit service data on the grant-free resource and/or the grant-based resource.

A terminal is provided in the embodiments of the present disclosure, including a processor, a memory and a computer program stored in the memory and executable on the processor, where the computer program is executed by the processor to perform the data transmission method hereinabove.

A computer-readable storage medium is provided in the embodiments of the present disclosure, where a computer program is stored in the computer-readable storage medium, and the computer program is executed by a processor to perform the data transmission method hereinabove.

BRIEF DESCRIPTION OF THE DRAWINGS

In order to describe the technical solutions of the embodiments of the present disclosure more clearly, the drawings used in the description of the embodiments of the present disclosure are briefly introduced below. Obviously, the drawings in the following description are merely some embodiments of the present disclosure. For those of ordinary skill in the art, other drawings can be obtained based on these drawings without creative work.

FIG. 1 is a schematic view of a data transmission method in an embodiment of the present disclosure;

FIG. 2 is a schematic view of a data transmission method in another embodiment of the present disclosure;

DETAILED DESCRIPTION

Figure 3:
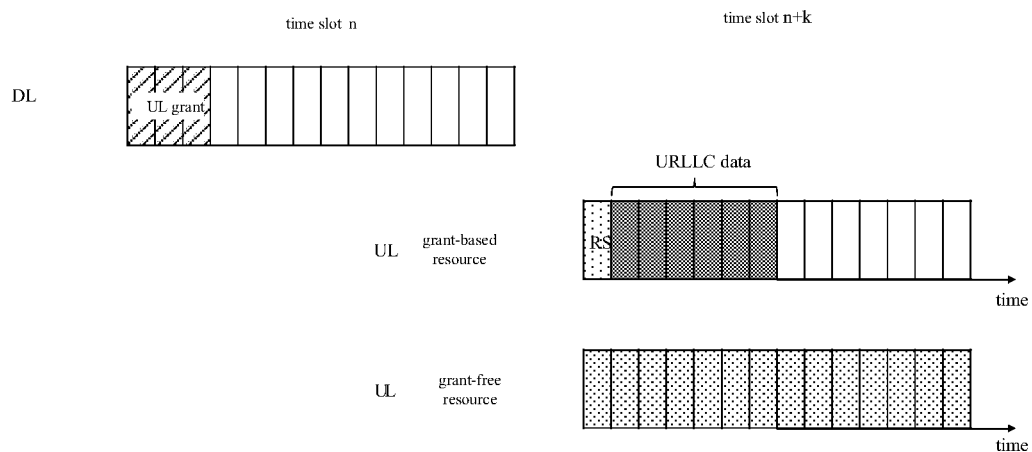
FIG. 3 is a schematic view of a data transmission method in another embodiment of the present disclosure.

To make the objectives, technical solutions, and advantages of the embodiments of the present disclosure clearer, the technical solutions of the embodiments of the present disclosure will be clearly and completely described below with reference to the drawings of the embodiments of the present disclosure. Obviously, the described embodiments are a part of embodiments of the present disclosure, but not all the embodiments. Based on the described embodiments of the present disclosure, all other embodiments obtained by those of ordinary skill in the art fall within the scope of the present disclosure.

Referring to FIG. 1, a data transmission method is provided in the embodiments of the present disclosure, applied to a terminal, including:

Step 11: in the case that both a grant-free resource and a grant-based resource are available for the terminal, choosing, by the terminal, to transmit service data on the grant-free resource preferentially; or choosing, by the terminal, to transmit service data on the grant-based resource preferentially; or choosing dynamically, by the terminal, to transmit service data on the grant-free resource and/or the grant-based resource.

According to the above embodiment of the present disclosure, it is able to clarify how the terminal selects the resource used for the transmission of service data in the case that both the grant-free resource and the grant-based resource are available for the terminal at the same time.

In the embodiment of the present disclosure, the grant-free resources are usually configured through a high-layer signaling or a layer-2 signaling, and the grant-based resources may be configured through a high-layer signaling or a layer-2 signaling, or may be dynamically indicated through a layer-1 signaling.

The terminal in this embodiment of the present disclosure may be a wireless terminal or a wired terminal. The wireless terminal may be a device that provides voice and/or other service data connectivity to the user, a handheld device with a wireless connection function, or a wireless modem. Other processing equipment. A wireless terminal can communicate with one or more core networks via a Radio Access Network (RAN). The wireless terminal may be a mobile terminal, such as a mobile phone (or a "cellular" phone) and a computer with a mobile terminal, for example, can be a portable, pocket-sized, handheld, computer-built or vehicle-mounted mobile devices that exchange languages and/or data with a wireless access network. For example, a Personal Communication Service (PCS) phone, a cordless phone, a Session Initiation Protocol (SIP) phone, a Wireless Local Loop (WLL) station, a Personal Digital Assistants (PDA). A wireless terminal can also be referred to as a system, a subscriber unit, a subscriber station, a mobile station, a Mobile, a remote station, an Access Terminal, a User Terminal, a User Agent, and a User Device or User Equipment, which are not limited herein.

The following describes in detail the service data transmission method in the above three optical schemes.

(1) The terminal preferentially chooses to transmit service data on a grant-free resource.

In the embodiment of the present disclosure, according to the service data that the terminal currently needs to transmit, choosing, by the terminal, to transmit the service data on the grant-free resource preferentially includes:

in the case that there is only one type of service data in a buffer of the terminal and the service data can be transmitted on the grant-free resource, choosing, by the terminal, to transmit the service data on the grant-free resource; and/or in the case that there is only one type of service data in the buffer of the terminal and the service data can be transmitted on the grant-based resource, choosing, by the terminal, to transmit the service data on the grant-based resource; and/or in the case that there are at least two types of service data in the buffer of the terminal, transmitting, by the terminal, the service data with a highest priority of the at least two types of service data on a grant-free resource, and dropping or cancelling, by the terminal, the transmission of other service data, thereby ensuring that the service data with a higher priority may be sent first.

In the embodiment of the present disclosure, the priority of the service data may be determined by the parameters of the service data. The parameters of the service data include at least one of: the type of the service data (for example, URLLC, eMBB, etc.), the delay requirement of the service data, the reliability requirements of the service data, the quality of service (QoS) requirements of the service data, physical resources corresponding to logical channels corresponding to the service data and attributes of service data being new data or retransmitted data.

For example, the priority of URLLC service data is higher than the priority of eMBB service data, and the priority of retransmission data is higher than the priority of any other service data.

In the embodiment of the present disclosure, in the case that the physical resource corresponding to the logical channel corresponding to the service data is used to determine the priority, the terminal may prioritize the logical channels according to an indication of an uplink grant (UL grant).

Specifically, the base station configures a set of transmission profiles for the terminal, including: index, numerologies, TTI duration and the like; each logical channel (service) corresponds to one or more transmission profiles; the transmission profile index of this transmission is carried in each UL grant, and the physical layer of the terminal may report the same to the MAC layer. The MAC layer performs logical channel priority processing accordingly: 1. selecting a set of logical channels that can be transmitted on this grant; 2. sorting the logical channels of the set and select the logical channels that can be transmitted.

In the case that there are at least two types of service data need to be transmitted in the buffer of the terminal, the embodiment of transmitting, by the terminal, the service data with a highest priority of the at least two types of service data on the grant-free resource, and dropping or cancelling, by the terminal, a transmission of other service data includes:

in the case that first service data and second service data scheduled by an uplink grant are in the buffer of the terminal and a priority of the first service data is higher than a priority of the second service data, transmitting, by the terminal, the first service data on the grant-free resource, and dropping or cancelling, by the terminal, the transmission of the second service data; and/or in the case that the first service data and a new data packet of the second service data scheduled by the uplink grant are in the buffer of the terminal and the priority of the first service data is higher than the priority of the second service data, transmitting, by the terminal, the first service data on the grant-free resource, and dropping or cancelling, by the terminal, the transmission of the second service data; and/or in the case that the first service data and a retransmission data packet of the second service data scheduled by the uplink grant are in the buffer of the terminal, transmitting, by the terminal, the retransmission data packet of the second service data on the grant-based resource, and dropping, by the terminal, the transmission of the first service data.

In the embodiment of the present disclosure, the step of dropping or cancelling the transmission of the second service data includes:

in the case that the transmission of the second service data is not started, transmitting, by the terminal, the first service data on the grant-free resource, and dropping, by the terminal, the transmission of the second service data; and/or in the case that the transmission of the second service data is started, dropping, by the terminal, the transmission of the second service data, transmitting, by the terminal, the first service data on the grant-free resource and dropping, by the terminal, the transmission of the remaining second service data; or dropping, by the terminal, only the transmission of the second service data occupying a same time domain resource with the grant-free resource.

The dropping only the transmission of the second service data occupying a same time domain resource with the grant-free resource refers to: after the transmission of the first service data occupying the same time domain resource on the grant-free resource is completed, the transmission of the second service data on the grant-based resource may be continued on other time domain resource.

(2) The terminal preferentially chooses to transmit service data on a grant-based resource.

In the embodiment of the present disclosure, according to the service data that the terminal currently needs to transmit, the step of terminal choosing to transmit the service data on the grant-based resource preferentially includes:

in the case that there is only one type of service data in a buffer of the terminal and the service data can be transmitted on the grant-based resource, choosing, by the terminal, to transmit the service data on the grant-based resource; and/or in the case that there is only one type of service data in the buffer of the terminal and the service data can be transmitted only on the grant-free resource, choosing, by the terminal, to transmit the service data on the grant-free resource; and/or in the case that there are at least two types of service data in the buffer of the terminal, transmitting, by the terminal, the service data with a highest priority of the at least two types of service data on a grant-based resource, and dropping or cancelling, by the terminal, the transmission of other service data; or reassembling, by the terminal, the service data with the highest priority into a current data packet, and transmitting, by the terminal, a reassembled data packet on the grant-based resource, thereby ensuring that the service data with a higher priority may be sent first.

In the case that there are at least two types of service data in the buffer of the terminal, the embodiment of transmitting, by the terminal, the service data with the highest priority of the at least two types of service data on the grant-based resource, and dropping or cancelling, by the terminal, the transmission of other service data, or reassembling, by the terminal, the service data with the highest priority into the current data packet, and transmitting, by the terminal, the reassembled data packet on the grant-based resource may include:

in the case that first service data and second service data scheduled by an uplink grant are in the buffer of the terminal and a priority of the first service data is higher than a priority of the second service data, transmitting, by the terminal, the first service data on the grant-based resource, and dropping or cancelling, by the terminal, the transmission of the second service data; or reassembling, by the terminal, the first service data and the second service data to obtain a reassembled data packet, and transmitting, by the terminal, the reassembled data packet on the grant-based resource; and/or in the case that the first service data and a new data packet of the second service data scheduled by the uplink grant are in the buffer of the terminal and the priority of the first service data is higher than the priority of the second service data, transmitting, by the terminal, the first service data on the grant-based resource, and dropping or cancelling, by the terminal, the transmission of the second service data; or reassembling, by the terminal, the first service data and the second service data to obtain a reassembled data packet, and transmitting, by the terminal, the reassembled data packet on the grant-based resource; and/or in the case that the first service data and a retransmission data packet of the second service data scheduled by the uplink grant are in the buffer of the terminal, transmitting, by the terminal, the retransmission data packet of the second service data on the grant-based resource, and dropping, by the terminal, the transmission of the first service data.

In the embodiment of the present disclosure, in the case that the first service data and the second service data are reassembled, a data block of the first service data is mapped to a resource adjacent to a reference signal, so as to improve the reliability of the transmission of the first service data with a higher priority.

(3) The terminal chooses to transmit service data on grant-free resource and/or the grant-based resource.

In the embodiment of the present disclosure, according to the service data that the terminal currently needs to transmit, the step of terminal choosing dynamically to transmit the service data on grant-free resource and/or the grant-based resource includes:

in the case that only one type of service data is in a buffer of the terminal, selecting, according to a parameter of the service data, a transmission parameter of the grant-free resource and/or a transmission parameter of the grant-based resource, the grant-free resource and/or the grant-based resource matched with the service data, and transmitting the service data on the selected grant-free resource and/or the grant-based resource; and/or in the case that at least two types of service data are in the buffer of the terminal, determining the service data with a highest priority, selecting, according to a parameter of the service data with the highest priority, a transmission parameter of the grant-free resource and/or a transmission parameter of the grant-based resource, the grant-free resource and/or the grant-based resource matched with the service data with the highest priority, and transmitting the service data with the highest priority on the selected grant-free resource and/or the grant-based resource.

Optionally, the transmission parameters of the grant-free resource and the grant-based resource include any one or more of a time-frequency resource allocation, a Modulation and Coding Scheme (MCS), a transmit power and a sub-carrier spacing.

Optionally, the parameter of the service data includes any one or more of a service type, a service priority, and a size of a data block of the service data.

The following describes how to select a grant-free resource and/or a grant-based resource matched with the service data.

1) In the case that there is only one type of service data in buffer of the terminal, and the service data is the first service data with a high priority which is not scheduled by an uplink grant, in some embodiments, a grant-free resource and/or a grant-based resource that matches the service data may be selected by comparing a size of a data block of the first service data with a size of the resource.

For example, in the case that the size of the data block of the first service data is smaller than or equal to the size of the largest data block that the grant-free resource can carry, the terminal may choose to transmit the first service data on the grant-free resource; in the case that the size of the data block of the first service data is larger than the size of the largest data block that the grant-free resource can carry, the terminal may choose to transmit the first service data on the grant-based resource.

In some embodiments, the resource matched with the first service data may be selected by comparing an MCS level of the grant-free resource with an MCS level of the grant-based resource.

For example, in the case that the MCS level of the grant-free resource is lower than or equal to the MCS level of the grant-based resource, the terminal chooses to transmit the first service data on the grant-free resource; in the case that the MCS level of the grant-free resource is higher than the MCS level of the grant-based resource, the terminal chooses to transmit the first service data on the grant-based resource.

In some embodiments, the resource matched with the first service data may be selected by comparing a transmit power of the grant-free resource with a transmit power of the grant-based resource.

For example, in the case that the transmit power of the grant-free resource is larger than or equal to the transmit power of the grant-based resource, the terminal chooses to transmit the first service data on the grant-free resource; in the case that the transmit power of the grant-free resource is smaller than the transmit power of the grant-based resource, the terminal chooses to transmit the first service data on the grant-based resource.

In some embodiments, the resource matched with the first service data may be selected by comparing a subcarrier spacing of the grant-free resource with a subcarrier spacing of the grant-based resource.

For example, in the case that the subcarrier spacing of the grant-free resource is larger than or equal to the subcarrier spacing of the grant-based resource, the terminal chooses to transmit the first service data on the grant-free resource; in the case that the subcarrier spacing of the grant-free resource is smaller than the subcarrier spacing of the grant-based resource, the terminal chooses to transmit the first service data on the grant-based resource.

Alternatively, the resource matched with the first service data may be selected based on at least two parameters of the resources in the above embodiment.

2) In the case that there is only one type of service data in the buffer of the terminal and the service data is the second service data scheduled by the uplink grant, the terminal chooses to transmit the second service data on the grant-based resource.

3) In the case that there are at least two types of service data in the buffer of the terminal, the terminal firstly determines the service data with a highest priority, then selects, according to a parameter of the service data with the highest priority, a transmission parameter of the grant-free resource and/or a transmission parameter of the grant-based resource, the grant-free resource and/or the grant-based resource matched with the service data with the highest priority.

The step of selecting the grant-free resource and/or the grant-based resource matched with the service data with the highest priority may include:

in some embodiments, a grant-free resource and/or a grant-based resource that matches the service data may be selected by comparing a size of a data block of the service data with the highest priority with a size of the resource.

For example, in the case that the size of the data block of the service data with the highest priority is smaller than or equal to the size of the largest data block that the grant-free resource can carry, the terminal may choose to transmit the service data with the highest priority on the grant-free resource; in the case that the size of the data block of the service data with the highest priority is larger than the size of the largest data block that the grant-free resource can carry, the terminal may choose to transmit the service data with the highest priority on the grant-based resource.

In some embodiments, the resource matched with the service data with the highest priority may be selected by comparing an MCS level of the grant-free resource with an MCS level of the grant-based resource.

For example, in the case that the MCS level of the grant-free resource is lower than or equal to the MCS level of the grant-based resource, the terminal chooses to transmit the service data with the highest priority on the grant-free resource; in the case that the MCS level of the grant-free resource is higher than the MCS level of the grant-based resource, the terminal chooses to transmit the service data with the highest priority on the grant-based resource.

In some embodiments, the resource matched with the service data with the highest priority may be selected by comparing a transmit power of the grant-free resource with a transmit power of the grant-based resource.

For example, in the case that the transmit power of the grant-free resource is larger than or equal to the transmit power of the grant-based resource, the terminal chooses to transmit the service data with the highest priority on the grant-free resource; in the case that the transmit power of the grant-free resource is smaller than the transmit power of the grant-based resource, the terminal chooses to transmit the service data with the highest priority on the grant-based resource.

In some embodiments, the resource matched with the service data with the highest priority may be selected by comparing a subcarrier spacing of the grant-free resource with a subcarrier spacing of the grant-based resource.

For example, in the case that the subcarrier spacing of the grant-free resource is larger than or equal to the subcarrier spacing of the grant-based resource, the terminal chooses to transmit the service data with the highest priority on the grant-free resource; in the case that the subcarrier spacing of the grant-free resource is smaller than the subcarrier spacing of the grant-based resource, the terminal chooses to transmit the service data with the highest priority on the grant-based resource.

Alternatively, the resource matched with the service data with the highest priority may be selected based on at least two parameters of the resources in the above embodiment.

Optionally, in the case that the service data with the highest priority in the above embodiment is the first service data with a high priority that is not scheduled by an uplink grant, the above step of selecting the resource matched with the service data with the highest priority is performed.

In the case that the service data with the highest priority is the retransmission data of the second service data scheduled by the uplink grant, the grant-based resources may also be directly selected to transmit the retransmission data.

In the embodiment of the present disclosure, choosing dynamically, by the terminal, to transmit service data on the grant-free resource and/or the grant-based resource includes:

in the case that at least two types of service data are in the buffer of the terminal and the terminal chooses to transmit the service data on the grant-free resource, transmitting, by the terminal, only the service data with the highest priority of the at least two types of service data on the grant-free resource, and dropping or cancelling, by the terminal, a transmission of other service data; and/or in the case that at least two types of service data are in the buffer of the terminal and the terminal chooses to transmit the service data on the grant-based resource, transmitting, by the terminal, only the service data with the highest priority of the at least two types of service data on the grant-based resource, and dropping or cancelling, by the terminal, a transmission of other service data; or reassembling, by the terminal, the service data with the highest priority into a data packet, and transmitting, by the terminal, a reassembled data packet on the grant-based resource.

Of course, both the grant-free resource and the grant-based resource that can be used for transmitting service data in the above embodiments are available resources, and the grant-free resource is a resource in an activated state.

The data transmission method of the present disclosure will be further described in detail below with reference to embodiments.

Embodiment One

In the embodiment of the present disclosure, the service data A can be transmitted on the grant-free resource or can be transmitted on the grant-based resource through an uplink grant scheduling. The service data B can only be transmitted on the grant-based resource, and the priority of the service data A is higher than that of the service data B.

1) In the case that there is only service data A in the buffer of the terminal:

In the case that the terminal chooses to transmit the service data on the grant-free resource preferentially, the grant-free resource is adopted to transmit the service data A.

In the case that the terminal chooses to transmit the service data on the grant-based resource preferentially, the grant-based resource scheduled by the uplink grant is adopted to transmit the service data A.

In the case that the terminal chooses dynamically to transmit the service data on the grant-free resource and/or the grant-based resource, the selection of the resource for transmitting the service data A may be determined according to the scheme in the above embodiment.

2) In the case that there is only the service data B in the buffer of the terminal, the grant-based resource scheduled by the uplink grant is adopted to transmit the service data B.

3) In the case that the terminal currently buffers the service data A and the service data B (that is, the service data A and the service data B are currently to be transmitted at the same time):

In the case that the terminal chooses to transmit service data on the grant-free resource preferentially, the grant-free resource is adopted to transmit the service data A, and the transmission of the service data B on the grant-based resource is dropped or cancelled.

In the case that the terminal chooses to transmit the service data on the grant-based resource preferentially, the grant-based resource scheduled by the uplink grant is adopted to transmit the service data A, and the transmission of the service data B on the grant-based resource is dropped or cancelled; or, the service data A and the service data B are reassembled, and the reassembled data packet is transmitted on grant-based resource. To ensure the reliability of service data A, the service data A may be mapped to resources adjacent to the reference signal.

In the case that the terminal chooses dynamically to transmit the service data on the grant-free resource and/or the grant-based resource, the selection of the resource may be determined according to the scheme in the above embodiment. If a grant-free resource is selected, the grant-free resource is adopted to transmit the service data A, and the transmission of the service data B on the grant-based resource is dropped or cancelled. If grant-based resource is selected, the grant-based resource scheduled by the uplink grant is adopted to transmit the service data A, and the transmission of the service data B on the grant-based resource is dropped or cancelled; or, the service data A and the service data B are reassembled, and the reassembled data packet is transmitted on the grant-based resource.

Embodiment Two

In the embodiment of the present disclosure, both the service data A and the service data B can be transmitted on the grant-free resource and on the grant-based resource scheduled by the uplink grant, the priority of the service data A is higher than that of the service data B.

1) In the case that there is only service data A in the buffer of the terminal:

In the case that the terminal chooses to transmit the service data on the grant-free resource preferentially, the grant-free resource is adopted to transmit the service data A.

In the case that the terminal chooses to transmit the service data on the grant-based resource preferentially, the grant-based resource scheduled by the uplink grant is adopted to transmit the service data A.

In the case that the terminal chooses dynamically to transmit the service data on the grant-free resource and/or the grant-based resource, the selection of the resource for transmitting the service data A may be determined according to the scheme in the above embodiment.

2) In the case that there is only service data B in the buffer of the terminal:

In the case that the terminal chooses to transmit the service data on the grant-free resource preferentially, the grant-free resource is adopted to transmit the service data B.

In the case that the terminal chooses to transmit the service data on the grant-based resource preferentially, the grant-based resource scheduled by the uplink grant is adopted to transmit the service data B.

3) In the case that the terminal currently buffers the service data A and the service data B (that is, the service data A and the service data B are currently to be transmitted at the same time):

In the case that the terminal chooses to transmit service data on the grant-free resource preferentially, the grant-free resource is adopted to transmit the service data A, and the transmission of the service data B on the grant-based resource is dropped or cancelled.

In the case that the terminal chooses to transmit the service data on the grant-based resource preferentially, the grant-based resource scheduled by the uplink grant is adopted to transmit the service data A, and the transmission of the service data B on the grant-based resource is dropped or cancelled; or, the service data A and the service data B are reassembled, and the reassembled data packet is transmitted on grant-based resource. To ensure the reliability of service data A, the service data A may be mapped to resources adjacent to the reference signal.

In the case that the terminal chooses dynamically to transmit the service data on the grant-free resource and/or the grant-based resource, the selection of the resource may be determined according to the scheme in the above embodiment. If a grant-free resource is selected, the grant-free resource is adopted to transmit the service data A, and the transmission of the service data B on the grant-based resource is dropped or cancelled. If grant-based resource is selected, the grant-based resource scheduled by the uplink grant is adopted to transmit the service data A, and the transmission of the service data B on the grant-based resource is dropped or cancelled; or, the service data A and the service data B are reassembled, and the reassembled data packet is transmitted on the grant-based resource.

Embodiment Three

In the embodiment of the present disclosure, the service data A can only be transmitted on the grant-free resources, the service data B can only be transmitted on the grant-based resource scheduled by the uplink grant, and the priority of the service data A is higher than the priority of the service data B.

1) In the case that there is only service data A in the buffer of the terminal, the grant-free resource is adopted to transmit the service data A.

2) In the case that there is only the service data B in the buffer of the terminal, the grant-based resource scheduled by the uplink grant is adopted to transmit the service data B.

3) In the case that the terminal currently buffers the service data A and the service data B (that is, the service data A and the service data B are currently to be transmitted at the same time), the service data A is preferentially transmitted on the grant-free resource, and the transmission of the service data B on the grant-based resource is dropped or cancelled.

Embodiment Four

In the embodiment of the present disclosure, the terminal currently buffers URLLC service data (URLLC service is a low-latency, high-reliability and high-priority service) and eMBB service data (eMBB service has lower delay requirements and lower reliability requirements and low priority), that is, URLLC service data and eMBB service data need to be transmitted currently at the same time.

1) In the case that the terminal has not started transmitting eMBB service data on the grant-based resource scheduled by the uplink grant:

Referring to FIG. 2, in the case that the terminal chooses to transmit the service data on grant-free resource preferentially, the terminal preferentially transmits URLLC data on the grant-free resource and drops the transmission of the eMBB service data scheduled by the uplink grant.

At this time, the base station may reschedule a new transmission of eMBB service data or schedule a retransmission of eMBB service data, in the case that the base station finds, by detecting the grant-free transmission or uplink discontinuous transmission function (DTX), that the terminal does not send the eMBB service data scheduled by uplink grant.

Referring to FIG. 3, in the case that the terminal chooses to transmit the service data on the grant-based resource preferentially, the terminal transmits the URLLC data on the grant-based resource scheduled by the uplink grant, and drops the transmission of the eMBB data scheduled by the uplink grant.

Figure 4:
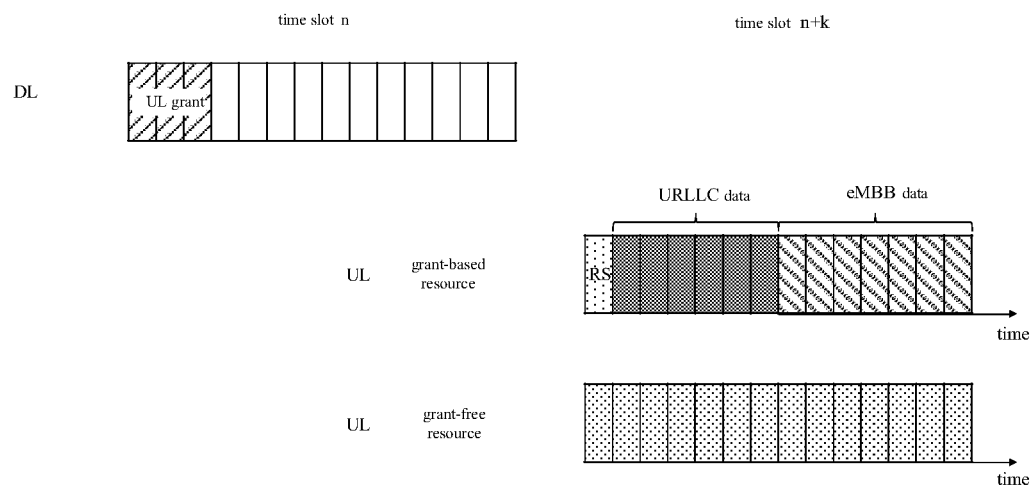
FIG. 4 is a schematic view of a data transmission method in another embodiment of the present disclosure.

Referring to FIG. 4, in the case that the terminal chooses to transmit the service data on the grant-based resource preferentially, the terminal reassembles the URLLC service and the eMBB service data into a data packet, and transmits the reassembled data packet on the grant-based resource scheduled by the uplink grant. If the transmission scheduled by the uplink grant is based on a code block group (CBG), in the reassembled data packet that contains the URLLC service data and the eMBB service data, the CBG containing the URLLC service data can be mapped to the resources adjacent to the reference signal (RS), thereby improving the reliability of URLLC service data transmission.

Figure 5:
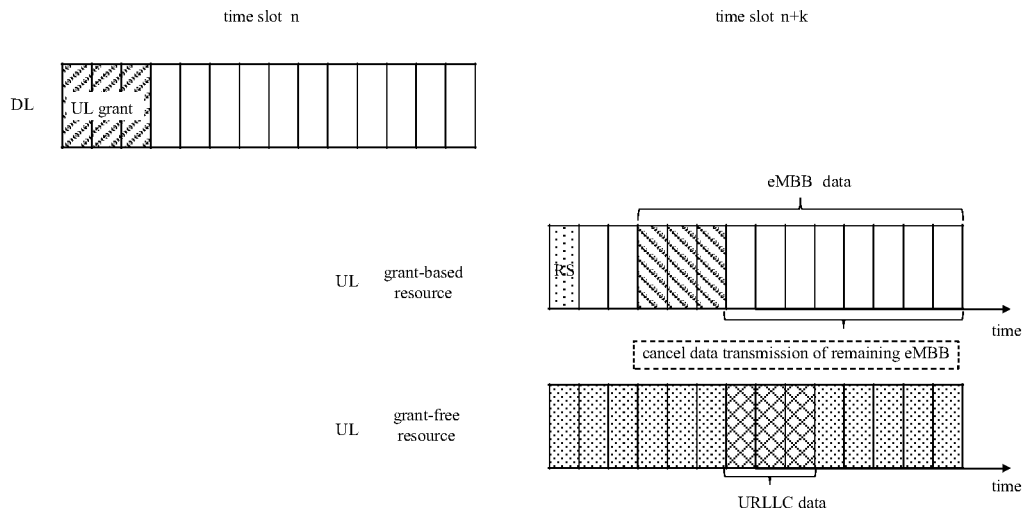
FIG. 5 is a schematic view of a data transmission method in another embodiment of the present disclosure.

2) In the case that the terminal has started transmitting eMBB service data on the grant-based resource scheduled by the uplink grant:

Referring to FIG. 5, in the case that the terminal chooses to transmit the service data on grant-free resource preferentially, the terminal cancels the transmission of the eMBB service data scheduled by the uplink grant, the terminal preferentially transmits the URLLC data on the grant-free resource and drops the transmission of the remaining eMBB service data.

At this time, the base station may schedule a retransmission of eMBB service data, in the case that the base station finds, by detecting the grant-free transmission or uplink discontinuous transmission function (DTX), that the terminal does not send the eMBB service data scheduled by uplink grant.

Figure 6:
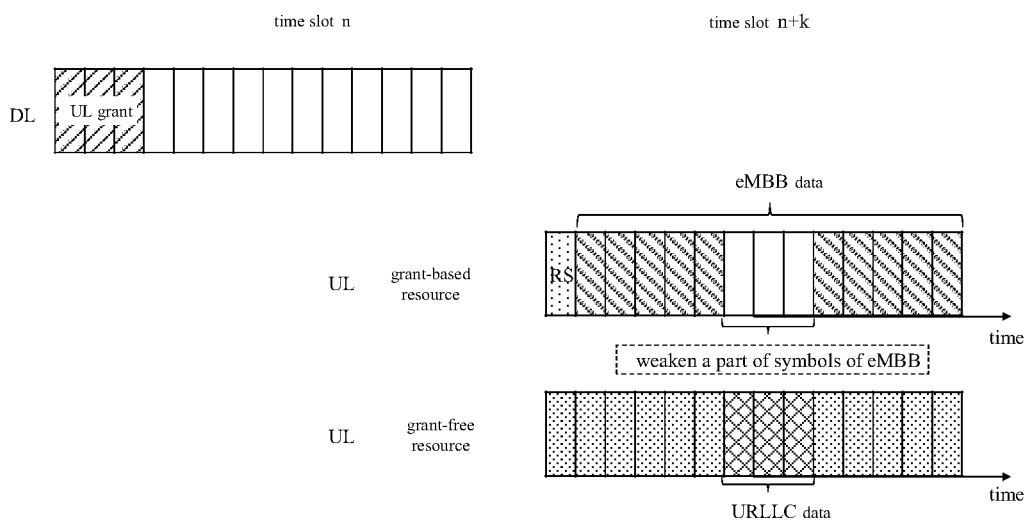
FIG. 6 is a schematic view of a data transmission method in another embodiment of the present disclosure.

Referring to FIG. 6, in the case that the terminal chooses to transmit the service data on the grant-free resource preferentially, the terminal cancels the transmission of the eMBB service data scheduled by the uplink grant, the terminal preferentially transmits the URLLC data on the grant-free resource, and only drops the transmission of the eMBB service data occupying a same time domain resource with the transmission of the URLLC service data. In the case that the transmission of the URLLC service data is completed, the transmission of the remaining eMBB service data not occupying a same time domain resource with the transmission of the URLLC service data may be continued.

Embodiment Five

In the embodiment of the present disclosure, the terminal currently buffers the URLLC service data (the URLLC service is a low-latency, high-reliability, high-priority service). Assume that the size of URLLC service data is Da; the size of the largest data block that the grant-free resource can carry is Ra; the MCS level of the grant-free resource is MCS#a; the transmit power of the grant-free resource is Pa; the size of the largest data block that the resource can carry is Rb, the MCS level of the grant-based resource is MCS#b, and the transmit power of the grant-based resource is Pb.

1) The size of the URLLC service data is larger than the size of the largest data block that the grant-free resource can carry (that is, Da>Ra, which means that the grant-free resource is not enough to carry the transmission of this URLLC service data), and smaller than the size of the largest data block that the grant-based resource scheduled by the uplink grant can carry (that is, Da<Rb), the terminal transmits the URLLC service data on the grant-based resources scheduled by the uplink grant;

2) In the case that MCS #a>MCS #b, it means that the grant-based transmission resource scheduled by the uplink grant may be more reliable than the grant-based transmission resource, and the terminal may transmit the URLLC service data on the grant-based resource scheduled by the uplink grant;

3) In the case that Pa<Pb, if the terminal uses a higher transmit power, the reliability of the transmission may be improved, and if the terminal transmits on the grant-based resource, the interference impact caused by the increase of the transmit power may be reduced. Therefore, optionally, the terminal may transmit the URLLC service data on the grant-based resource scheduled by the uplink grant.

Embodiment Six

In the embodiment of the present disclosure, the terminal is configured with both a mini-slot-based grant-free resource and a micro-slot-based grant-based resource scheduled by an uplink grant. The terminal currently buffers the service data A (the service A is a high-priority service with a low latency and high reliability).

1) If the terminal also buffers a new TB transmission scheduled by the uplink grant:

In some embodiments, the terminal preferentially transmits the service data A on the grant-based resource, and drops the transmission of the grant-free resource.

In other embodiments, the terminal transmits the service data A on the grant-free resource and the grant-based resource at the same time. For example, the terminal may transmit the same data block of the service data A on the grant-free resource and the grant-based resource at the same time, or transmit the data blocks of different redundant versions of the service data A on the grant-free resource and the grant-based resource, thereby improving the reliability of the transmission of the service data A.

2) If the terminal also buffers a retransmitted TB scheduled by the uplink grant:

The terminal preferentially transmits the retransmitted TB on the grant-based resource.

Embodiment Seven

In the embodiment of the present disclosure, the terminal is configured with a grant-free resource with a numerology of N1 and a grant-based resource with a numerology of N1 scheduled by the uplink grant. The terminal currently buffers the service data A (the service A is a high-priority service with a low latency and high reliability).

1) If the terminal also buffers a new TB transmission scheduled by the uplink grant:

In some embodiments, the terminal preferentially transmits the service data A on the grant-based resource, and drops the transmission of the grant-free resource.

In other embodiments, the terminal transmits the service data A on the grant-free resource and the grant-based resource at the same time. For example, the terminal may transmit the same data block of the service data A on the grant-free resource and the grant-based resource at the same time, or transmit the data blocks of different redundant versions of the service data A on the grant-free resource and the grant-based resource, thereby improving the reliability of the transmission of the service data A.

2) If the terminal also buffers a retransmitted TB scheduled by the uplink grant:

The terminal preferentially transmits the retransmitted TB on the grant-based resource.

Embodiment Eight

In the embodiment of the present disclosure, the terminal is configured with a grant-free resource with a numerology of N1 (the subcarriers interval is S1) and a grant-based resource with a numerology of N2 (the subcarriers interval is S2) scheduled by the uplink grant. The terminal currently buffers the service data A (the service A is a high-priority service with a low latency and high reliability).

1) If the terminal also buffers a new TB transmission scheduled by the uplink grant:

If S1<S2, the terminal preferentially transmits the service data A on the grant-based resource, and drops the transmission of the grant-free resource.

If S1>=S2, the terminal preferentially transmits the service data A on the grant-free resource, and drops the transmission of the grant-based resource.

2) If the terminal also buffers a retransmitted TB scheduled by the uplink grant:

The terminal preferentially transmits the retransmitted TB on the grant-based resource.

A data detection method is further provided in the embodiments of the present disclosure, which is applied to a base station and includes:

configuring or indicating, by the base station, a grant-free resource and a grant-based resource for a terminal;

detecting, by the base station, on the grant-free resource and/or the grant-based resource, service data sent by the terminal.

In the embodiment of the present disclosure, the base station may detect the grant-free resource and/or the grant-based resource in multiple ways, which are described below by way of example.

In some embodiments, in the case that the terminal preferentially chooses to transmit the service data on the grant-free resource, the base station may preferentially perform the detection on the grant-free resource.

Further, the base station may drop the detection on the grant-based resource, or perform the detection on the grant-based resource after the detection on the grant-free resource is completed.

In some embodiments, in the case that the terminal preferentially chooses to transmit the service data on the grant-based resource, the base station may preferentially perform the detection on the grant-based resource.

Further, the base station may drop the detection on the grant-free resource, or perform the detection on the grant-free resource after the detection on the grant-based resource is completed.

In some embodiments, in the case that the terminal dynamically chooses to transmit the service data on the grant-free resource and/or the grant-based resource, the base station may perform the detection on the grant-free resource and the grant-based resource at the same time.

In some embodiments, after the base station detects the transmission of the grant-free resource, the base station may reschedule the transmission of the grant-based resource after n scheduling time intervals, where n is a positive integer and can be configured as required.

Further, the base station may schedule a retransmission of the entire data packet, or the base station may schedule an interrupted retransmission of the data packet.

The base station in the embodiment of the present disclosure may be a Base Transceiver Station (BTS) in Global System of Mobile communication (GSM) or Code Division Multiple Access (CDMA), or may be Base stations (NodeB, NB) in Wideband Code Division Multiple Access (WCDMA), or Evolutional Node B (eNB or eNodeB) in LTE, or relay stations or access points, or a base station in future 5G networks, etc., which are not limited herein.

Based on the same concept, a terminal is further provided in the embodiments of the present disclosure, including:

a first transmitting module, configured to, in the case that both a grant-free resource and a grant resource are available for the terminal, choose to transmit service data on the grant-free resource preferentially; or a second transmitting module, configured to, in the case that both a grant-free resource and a grant resource are available for the terminal, choose to transmit service data on the grant resource preferentially; or a third transmitting module, configured to, in the case that both a grant-free resource and a grant resource are available for the terminal, choose dynamically to transmit service data on the grant-free resource and/or the grant resource.

According to the above embodiment of the present disclosure, it is able to clarify how the terminal selects the resource used for the transmission of service data in the case that both the grant-free resource and the grant-based resource are available for the terminal at the same time.

In some embodiments of the present disclosure, the first transmitting module is further configured to: in the case that at least two types of service data are in a buffer of the terminal, transmit the service data with a highest priority of the at least two types of service data on the grant-free resource, and drop or cancel a transmission of other service data.

In some embodiments of the present disclosure, the first transmitting module is further configured to: in the case that first service data and second service data scheduled by an uplink grant are in the buffer of the terminal and a priority of the first service data is higher than a priority of the second service data, transmit the first service data on the grant-free resource, and drop or cancel the transmission of the second service data; and/or the first transmitting module is further configured to: in the case that the first service data and a new data packet of the second service data scheduled by the uplink grant are in the buffer of the terminal and the priority of the first service data is higher than the priority of the second service data, transmit the first service data on the grant-free resource, and drop or cancel the transmission of the second service data; and/or the first transmitting module is further configured to: in the case that the first service data and a retransmission data packet of the second service data scheduled by the uplink grant are in the buffer of the terminal, transmit the retransmission data packet of the second service data on the grant resource, and drop the transmission of the first service data.

Optionally, the first transmitting module is further configured to: in the case that the transmission of the second service data is not started, transmit the first service data on the grant-free resource, and drop the transmission of the second service data; and/or the first transmitting module is further configured to: in the case that the transmission of the second service data is started, cancel the transmission of the second service data, transmit the first service data on the grant-free resource and drop the transmission of the remaining second service data; or only drop the transmission of the second service data occupying a same time domain resource with the grant-free resource.

In some embodiments of the present disclosure, the second transmitting module is further configured to: in the case that at least two types of service data are in a buffer of the terminal, transmit the service data with a highest priority of the at least two types of service data on the grant resource, and drop or cancel a transmission of other service data, or reassemble the service data with the highest priority into a current data packet, and transmit a reassembled data packet on the grant resource.

In some embodiments of the present disclosure, the second transmitting module is further configured to: in the case that first service data and second service data scheduled by an uplink grant are in the buffer of the terminal and a priority of the first service data is higher than a priority of the second service data, transmit the first service data on the grant resource, and drop or cancel the transmission of the second service data; or reassemble the first service data and the second service data to obtain a reassembled data packet, and transmit the reassembled data packet on the grant resource; and/or the second transmitting module is further configured to: in the case that the first service data and a new data packet of the second service data scheduled by the uplink grant are in the buffer of the terminal and the priority of the first service data is higher than the priority of the second service data, transmit the first service data on the grant resource, and drop or cancel the transmission of the second service data; or reassemble the first service data and the second service data to obtain a reassembled data packet, and transmit the reassembled data packet on the grant resource; and/or the second transmitting module is further configured to: in the case that the first service data and a retransmission data packet of the second service data scheduled by the uplink grant are in the buffer of the terminal, transmit the retransmission data packet of the second service data on the grant resource, and drop the transmission of the first service data.

Optionally, the second transmitting module is further configured to: in the case that the first service data and the second service data are reassembled, map a data block of the first service data to a resource adjacent to a reference signal.

In some embodiments of the present disclosure, the third transmitting module is further configured to: in the case that only one type of service data is in a buffer of the terminal, select, according to a parameter of the service data, a transmission parameter of the grant-free resource and/or a transmission parameter of the grant resource, the grant-free resource and/or the grant resource matched with the service data, and transmit the service data on the selected grant-free resource and/or the grant resource; and/or the third transmitting module is further configured to: in the case that at least two types of service data are in the buffer of the terminal, determine the service data with a highest priority, select, according to a parameter of the service data with the highest priority, a transmission parameter of the grant-free resource and/or a transmission parameter of the grant resource, the grant-free resource and/or the grant resource matched with the service data with the highest priority, and transmit the service data with the highest priority on the selected grant-free resource and/or the grant resource.

Optionally, the transmission parameters of the grant-free resource and the grant resource include any one or more of a time-frequency resource allocation, a modulation and coding scheme, a transmit power and a subcarrier spacing.

Optionally, the parameter of the service data includes any one or more of a service type, a service priority, and a size of a data block of the service data.

Optionally, the third transmitting module is further configured to: in the case that at least two types of service data are in the buffer of the terminal and the terminal chooses to transmit the service data on the grant-free resource, transmit only the service data with the highest priority of the at least two types of service data on the grant-free resource, and drop or cancel a transmission of other service data; and/or the third transmitting module is further configured to: in the case that at least two types of service data are in the buffer of the terminal and the terminal chooses to transmit the service data on the grant resource, transmit only the service data with the highest priority of the at least two types of service data on the grant resource, and drop or cancel a transmission of other service data; or reassemble the service data with the highest priority into a data packet, and transmit a reassembled data packet on the grant resource.

According to the above terminal in the embodiment of the present disclosure, it is able to clarify how the terminal selects the resource used for the transmission of service data in the case that both the grant-free resource and the grant-based resource are available at the same time, thereby ensuring the transmission performance of a high-priority service data and avoiding the conflict of the grant-free transmission and the grant-based transmission.

A terminal is further provided in the embodiments of the present disclosure, including a processor, a memory and a computer program stored in the memory and executable on the processor, where the computer program is executed by the processor to perform the data transmission method in any one of the above embodiments.

A base station is further provided in the embodiments of the present disclosure, including a processor, a memory and a computer program stored in the memory and executable on the processor, where the computer program is executed by the processor to perform the data detection method in any one of the above embodiments.

A computer-readable storage medium is further provided in the embodiments of the present disclosure, where a computer program is stored in the computer-readable storage medium, and the computer program is executed by a processor to perform the data transmission method in any one of the above embodiments, which can achieve the same technical effect, in order to avoid repetition, it will not be repeated herein. The computer-readable storage medium is, for example, a read-only memory (ROM), a random access memory (RAM), a magnetic disk or an optical disk.

Figure 7:
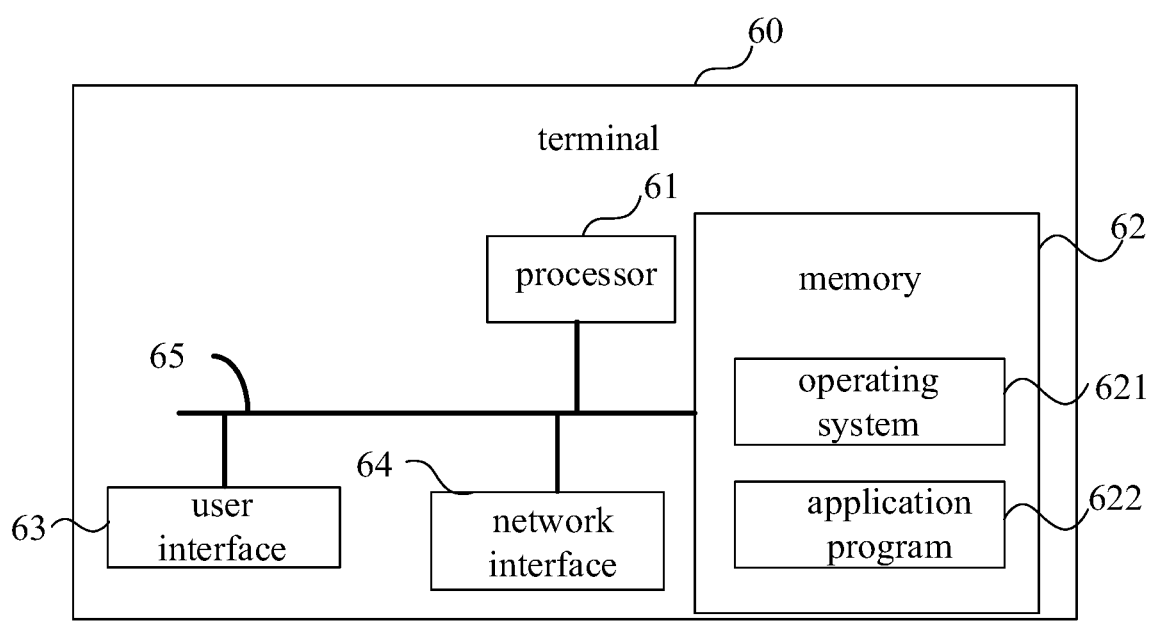
FIG. 7 is a schematic view of a terminal in an embodiment of the present disclosure.

A computer-readable storage medium is further provided in the embodiments of the present disclosure, where a computer program is stored in the computer-readable storage medium, and the computer program is executed by a processor to perform the data detection method in any one of the above embodiments, which can achieve the same technical effect, in order to avoid repetition, it will not be repeated herein. The computer-readable storage medium is, for example, a read-only memory (ROM), a random access memory (RAM), a magnetic disk or an optical disk Referring to FIG. 7, a terminal 60 is provided in an embodiment of the present disclosure. The terminal 60 shown in FIG. 7 includes: at least one processor 61, memory 62, at least one network interface 64, and other user interfaces 63. The various components in the terminal 60 are coupled together via a bus system 65. It can be understood that the bus system 65 is used to implement connection and communication between these components. The bus system 65 includes a power bus, a control bus, and a status signal bus in addition to the data bus. However, for the sake of clarity, various buses are marked as the bus system 65 in FIG. 7.

The user interface 63 may include a display, a keyboard, or a pointing device (for example, a mouse, a trackball, a touch pad, or a touch screen).

It can be understood that the memory 62 in the embodiment of the present disclosure may be a volatile memory or a non-volatile memory, or may include both volatile and non-volatile memory. The non-volatile memory may be a read-only memory (ROM), a programmable read-only memory (PROM), an erasable programmable read-only memory (EROM), or Erase programmable EPROM (EEPROM) or flash memory. The volatile memory may be a Random Access Memory (RAM), which is used as an external buffer. By way of example, but not limitation, many forms of RAM are available, such as Static Random Access Memory (SRAM), Dynamic Random Access Memory (DRAM), Synchronous Dynamic Random Access Memory (SDRAM), double data rate synchronous dynamic random access memory (DDRSDRAM), enhanced synchronous dynamic random access memory (Enhanced SDRAM, ESDRAM), synchronous connection dynamic random access memory (SLDRAM) and direct memory Bus random access memory (DRRAM). The memory 62 of the systems and methods described herein is intended to include, but is not limited to, these and any other suitable types of memory.

In some embodiments of the present disclosure, the memory 62 stores the following elements, executable modules or data structures, or a subset of them, or their extended set: an operating system 621 and an application program 622.

The operating system 621 includes various system programs, such as a framework layer, a core library layer, and a driver layer, etc., and is used to implement various basic services and process hardware-based tasks. The application program 622 includes various application programs, such as a media player, a browser, and the like, and is used to implement various application services. The program for implementing the method of the embodiment of the present disclosure may be included in the application program 622.

The terminal 60 further includes: a computer program stored in the memory 62 and executable on the processor 61. Specifically, the computer program may be a computer program in an application program 622. The computer program is executed by the processor 61 to: in the case that both a grant-free resource and a grant resource are available for the terminal, choose to transmit service data on the grant-free resource preferentially; or choose to transmit service data on the grant resource preferentially; or choose dynamically to transmit service data on the grant-free resource and/or the grant resource.

The method disclosed in the foregoing embodiment of the present disclosure may be applied to the processor 61 or implemented by the processor 61. The processor 61 may be an integrated circuit chip and has a signal processing capability. In the implementation process, each step of the above method may be completed by an integrated logic circuit of hardware in the processor 61 or an instruction in the form of software. The processor 61 may be a general-purpose processor, a digital signal processor (DSP), an application specific integrated circuit (ASIC), a field programmable gate array (FPGA), or other programmable processors or other programming logic devices, discrete gate or transistor logic devices, discrete hardware components. Various methods, steps, and logical block diagrams disclosed in the embodiments of the present disclosure may be implemented or executed. A general-purpose processor may be a microprocessor or the processor may be any conventional processor or the like. The steps of the method disclosed in combination with the embodiments of the present disclosure may be directly implemented by a hardware decoding processor, or may be performed by using a combination of hardware and software modules in the decoding processor. A software module may be located in a mature storage medium such as a random access memory, a flash memory, a read-only memory, a programmable read-only memory, or an electrically erasable programmable memory, a register, and the like. The storage medium is located in the memory 62, and the processor 61 reads the information in the memory 62 and completes the steps of the foregoing method in combination with its hardware.

It can be understood that the embodiments described herein may be implemented by hardware, software, firmware, middleware, microcode, or a combination thereof. For hardware implementation, the processing unit can be implemented in one or more Application Specific Integrated Circuits (ASICs), Digital Signal Processors (DSPs), Digital Signal Processing Devices (DSPDs), and programmable logic device (PLD), Field Programmable Gate Array (FPGA), general-purpose processor, controller, microcontroller, microprocessor, other electronic unit for performing the functions described in this application or the combination thereof.

For software implementation, the techniques described herein can be implemented through modules (e.g., procedures, functions, etc.) that perform the functions described herein. Software codes may be stored in a memory and executed by a processor. The memory may be implemented in the processor or external to the processor.

Optionally, in another embodiment, the computer program is executed by the processor 61 to: in the case that there are at least two types in the buffer of the terminal In the case of service data, the terminal transmits the service data with the highest priority among the at least two types of service data on a grant-free resource, and drops or cancels the transmission of other service data.

Optionally, in another embodiment, the computer program is executed by the processor 61 to:

in the case that first service data and second service data scheduled by an uplink grant are in the buffer of the terminal and a priority of the first service data is higher than a priority of the second service data, transmit the first service data on the grant-free resource, and drop or cancel the transmission of the second service data; and/or in the case that the first service data and a new data packet of the second service data scheduled by the uplink grant are in the buffer of the terminal and the priority of the first service data is higher than the priority of the second service data, transmit the first service data on the grant-free resource, and drop or cancel the transmission of the second service data; and/or in the case that the first service data and a retransmission data packet of the second service data scheduled by the uplink grant are in the buffer of the terminal, transmit the retransmission data packet of the second service data on the grant resource, and drop the transmission of the first service data.

Optionally, in another embodiment, the computer program is executed by the processor 61 to:

in the case that the transmission of the second service data is not started, transmit the first service data on the grant-free resource, and drop the transmission of the second service data; and/or in the case that the transmission of the second service data is started, cancel the transmission of the second service data, transmit the first service data on the grant-free resource and drop the transmission of the remaining second service data; or only drop the transmission of the second service data occupying a same time domain resource with the grant-free resource.

Optionally, in another embodiment, the computer program is executed by the processor 61 to: in the case that at least two types of service data are in a buffer of the terminal, transmit the service data with a highest priority of the at least two types of service data on the grant resource, and drop or cancel a transmission of other service data, or reassemble the service data with the highest priority into a current data packet, and transmit a reassembled data packet on the grant resource.

Optionally, in another embodiment, the computer program is executed by the processor 61 to:

in the case that first service data and second service data scheduled by an uplink grant are in the buffer of the terminal and a priority of the first service data is higher than a priority of the second service data, transmit the first service data on the grant resource, and drop or cancel the transmission of the second service data; or reassemble the first service data and the second service data to obtain a reassembled data packet, and transmit the reassembled data packet on the grant resource; and/or in the case that the first service data and a new data packet of the second service data scheduled by the uplink grant are in the buffer of the terminal and the priority of the first service data is higher than the priority of the second service data, transmit the first service data on the grant resource, and drop or cancel the transmission of the second service data; or reassemble the first service data and the second service data to obtain a reassembled data packet, and transmit the reassembled data packet on the grant resource; and/or in the case that the first service data and a retransmission data packet of the second service data scheduled by the uplink grant are in the buffer of the terminal, transmit the retransmission data packet of the second service data on the grant resource, and drop the transmission of the first service data.

Optionally, in another embodiment, the computer program is executed by the processor 61 to: in the case that the first service data and the second service data are reassembled, map a data block of the first service data to a resource adjacent to a reference signal.

Optionally, in another embodiment, the computer program is executed by the processor 61 to:

in the case that only one type of service data is in a buffer of the terminal, select, according to a parameter of the service data, a transmission parameter of the grant-free resource and/or a transmission parameter of the grant resource, the grant-free resource and/or the grant resource matched with the service data, and transmit the service data on the selected grant-free resource and/or the grant resource; and/or in the case that at least two types of service data are in the buffer of the terminal, determine the service data with a highest priority, select, according to a parameter of the service data with the highest priority, a transmission parameter of the grant-free resource and/or a transmission parameter of the grant resource, the grant-free resource and/or the grant resource matched with the service data with the highest priority, and transmit the service data with the highest priority on the selected grant-free resource and/or the grant resource.

Optionally, the transmission parameters of the grant-free resource and the grant resource include any one or more of a time-frequency resource allocation, a modulation and coding scheme, a transmit power and a subcarrier spacing.

Optionally, the parameter of the service data includes any one or more of a service type, a service priority, and a size of a data block of the service data.

Optionally, in another embodiment, the computer program is executed by the processor 61 to:

in the case that at least two types of service data are in the buffer of the terminal and the terminal chooses to transmit the service data on the grant-free resource, transmit only the service data with the highest priority of the at least two types of service data on the grant-free resource, and drop or cancel a transmission of other service data; and/or in the case that at least two types of service data are in the buffer of the terminal and the terminal chooses to transmit the service data on the grant resource, transmit only the service data with the highest priority of the at least two types of service data on the grant resource, and drop or cancel a transmission of other service data; or reassemble the service data with the highest priority into a data packet, and transmit a reassembled data packet on the grant resource.

The terminal 60 can implement the processes implemented by the terminal in the foregoing embodiments. To avoid repetition, details are not described herein again.

According to the above terminal 60 in the embodiment of the present disclosure, it is able to clarify how the terminal selects the resource used for the transmission of service data in the case that both the grant-free resource and the grant-based resource are available at the same time, thereby ensuring the transmission performance of a high-priority service data and avoiding the conflict of the grant-free transmission and the grant-based transmission.

Figure 8:
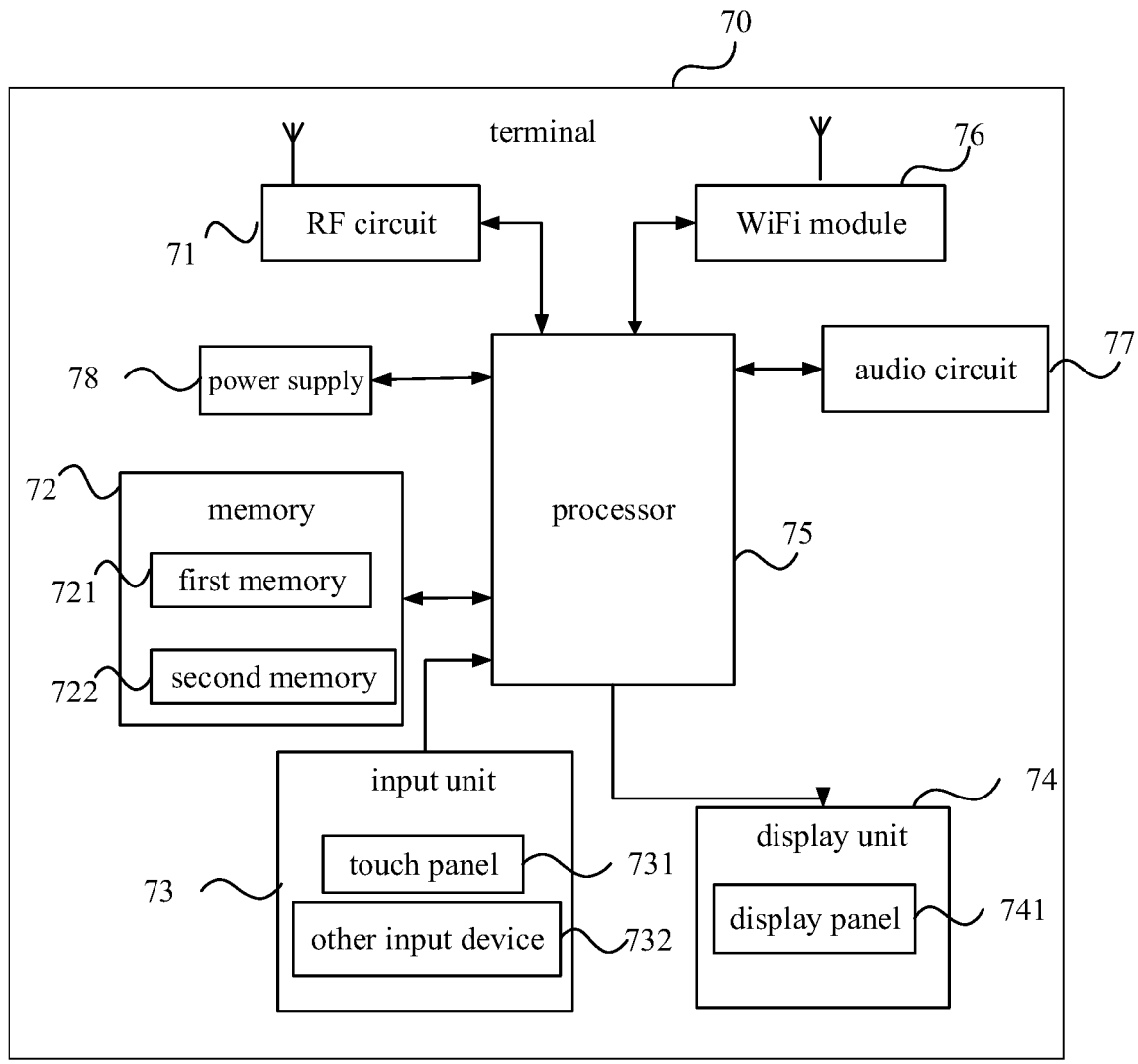
FIG. 8 is a schematic view of a terminal in another embodiment of the present disclosure.

Referring to FIG. 8, a terminal 70 is further provided in another embodiment of the present disclosure. Specifically, the terminal 70 in FIG. 8 may be a mobile phone, a tablet computer, a Personal Digital Assistant (PDA), or a vehicle-mounted computer.

The terminal 70 in FIG. 8 includes a radio frequency (RF) circuit 71, a memory 72, an input unit 73, a display unit 74, a processor 75, a WiFi (Wireless Fidelity) module 76, an audio circuit 77, and a power source 78.

The input unit 73 may be configured to receive digital or character information input by a user, and generate signal inputs related to user settings and function control of the terminal 70.

Specifically, in the embodiment of the present disclosure, the input unit 73 may include a touch panel 731. The touch panel 731, also known as a touch screen, can collect the user's touch operations on or adjacent to it (such as the operation of the user on the touch panel 731 using any suitable object or accessory such as a finger, a stylus pen), and according to the preset settings A specific program drives the corresponding connected device. Optionally, the touch panel 731 may include a touch detection device and a touch controller. Among them, the touch detection device detects the user's touch position, and detects the signal brought by the touch operation, and transmits the signal to the touch controller; the touch controller receives touch information from the touch detection device, converts it into contact coordinates, and sends it is given to the processor 75, and can receive commands from the processor 75 and execute them. In addition, the touch panel 731 may be implemented in various types such as a resistive type, a capacitive type, an infrared type, and a surface acoustic wave. In addition to the touch panel 731, the input unit 73 may also include other input devices 732. The other input devices 732 may include, but are not limited to, one or more of a physical keyboard, function keys (such as volume control keys, switch keys, etc.), trackball, mouse, joystick, etc.

The display unit 74 may be configured to display information input by the user or information provided to the user and various menu interfaces of the terminal 70. The display unit 74 may include a display panel 741. Optionally, the display panel 741 may be configured in the form of an LCD or an Organic Light-Emitting Diode (OLED).

It should be noted that the touch panel 731 may cover the display panel 741 to form a touch display screen. In the case that the touch display screen detects a touch operation on or adjacent to the touch display panel 731, it is transmitted to the processor 75 to determine the type of the touch event, and then the processor 75 may provide corresponding visual output on the touch display according to the type of touch event.

The touch display includes an application program interface display area and commonly used controls display area. The arrangement manners of the display area of the application program interface and the display area of the commonly used controls are not limited, and may be an arrangement manner for distinguishing the two display areas, such as an up-down arrangement, an left-right arrangement, and the like. The application program interface display area can be used to display the interface of the application program. Each interface may include interface elements such as at least one application icon and/or widget desktop control. The application program interface display area can also be an empty interface without any content. This common control display area is used to display controls with high usage, such as setting buttons, interface numbers, scroll bars, application icons such as phonebook icons, and so on.

In the embodiment of the present disclosure, by calling a software program and/or module stored in the first memory 721 and/or data stored in the second memory 722, the computer program is executed by the processor 75 to: in the case that both a grant-free resource and a grant resource are available for the terminal, choose to transmit service data on the grant-free resource preferentially; or choose to transmit service data on the grant resource preferentially; or choose dynamically to transmit service data on the grant-free resource and/or the grant resource.

Optionally, in another embodiment, the computer program is executed by the processor 75 to: in the case that there are at least two types in the buffer of the terminal In the case of service data, the terminal transmits the service data with the highest priority among the at least two types of service data on a grant-free resource, and drops or cancels the transmission of other service data.

Optionally, in another embodiment, the computer program is executed by the processor 75 to:

in the case that first service data and second service data scheduled by an uplink grant are in the buffer of the terminal and a priority of the first service data is higher than a priority of the second service data, transmit the first service data on the grant-free resource, and drop or cancel the transmission of the second service data; and/or in the case that the first service data and a new data packet of the second service data scheduled by the uplink grant are in the buffer of the terminal and the priority of the first service data is higher than the priority of the second service data, transmit the first service data on the grant-free resource, and drop or cancel the transmission of the second service data; and/or in the case that the first service data and a retransmission data packet of the second service data scheduled by the uplink grant are in the buffer of the terminal, transmit the retransmission data packet of the second service data on the grant resource, and drop the transmission of the first service data.

Optionally, in another embodiment, the computer program is executed by the processor 75 to:

in the case that the transmission of the second service data is not started, transmit the first service data on the grant-free resource, and drop the transmission of the second service data; and/or in the case that the transmission of the second service data is started, cancel the transmission of the second service data, transmit the first service data on the grant-free resource and drop the transmission of the remaining second service data; or only drop the transmission of the second service data occupying a same time domain resource with the grant-free resource.

Optionally, in another embodiment, the computer program is executed by the processor 75 to: in the case that at least two types of service data are in a buffer of the terminal, transmit the service data with a highest priority of the at least two types of service data on the grant resource, and drop or cancel a transmission of other service data, or reassemble the service data with the highest priority into a current data packet, and transmit a reassembled data packet on the grant resource.

Optionally, in another embodiment, the computer program is executed by the processor 75 to:

in the case that first service data and second service data scheduled by an uplink grant are in the buffer of the terminal and a priority of the first service data is higher than a priority of the second service data, transmit the first service data on the grant resource, and drop or cancel the transmission of the second service data; or reassemble the first service data and the second service data to obtain a reassembled data packet, and transmit the reassembled data packet on the grant resource; and/or in the case that the first service data and a new data packet of the second service data scheduled by the uplink grant are in the buffer of the terminal and the priority of the first service data is higher than the priority of the second service data, transmit the first service data on the grant resource, and drop or cancel the transmission of the second service data; or reassemble the first service data and the second service data to obtain a reassembled data packet, and transmit the reassembled data packet on the grant resource; and/or in the case that the first service data and a retransmission data packet of the second service data scheduled by the uplink grant are in the buffer of the terminal, transmit the retransmission data packet of the second service data on the grant resource, and drop the transmission of the first service data.

Optionally, in another embodiment, the computer program is executed by the processor 75 to: in the case that the first service data and the second service data are reassembled, map a data block of the first service data to a resource adjacent to a reference signal.

Optionally, in another embodiment, the computer program is executed by the processor 75 to:

in the case that only one type of service data is in a buffer of the terminal, select, according to a parameter of the service data, a transmission parameter of the grant-free resource and/or a transmission parameter of the grant resource, the grant-free resource and/or the grant resource matched with the service data, and transmit the service data on the selected grant-free resource and/or the grant resource; and/or in the case that at least two types of service data are in the buffer of the terminal, determine the service data with a highest priority, select, according to a parameter of the service data with the highest priority, a transmission parameter of the grant-free resource and/or a transmission parameter of the grant resource, the grant-free resource and/or the grant resource matched with the service data with the highest priority, and transmit the service data with the highest priority on the selected grant-free resource and/or the grant resource.

Optionally, the transmission parameters of the grant-free resource and the grant resource include any one or more of a time-frequency resource allocation, a modulation and coding scheme, a transmit power and a subcarrier spacing.

Optionally, the parameter of the service data includes any one or more of a service type, a service priority, and a size of a data block of the service data.

Optionally, in another embodiment, the computer program is executed by the processor 75 to:

in the case that at least two types of service data are in the buffer of the terminal and the terminal chooses to transmit the service data on the grant-free resource, transmit only the service data with the highest priority of the at least two types of service data on the grant-free resource, and drop or cancel a transmission of other service data; and/or in the case that at least two types of service data are in the buffer of the terminal and the terminal chooses to transmit the service data on the grant resource, transmit only the service data with the highest priority of the at least two types of service data on the grant resource, and drop or cancel a transmission of other service data; or reassemble the service data with the highest priority into a data packet, and transmit a reassembled data packet on the grant resource.

The terminal 75 can implement the processes implemented by the terminal in the foregoing embodiments. To avoid repetition, details are not described herein again.

According to the above terminal 75 in the embodiment of the present disclosure, it is able to clarify how the terminal selects the resource used for the transmission of service data in the case that both the grant-free resource and the grant-based resource are available at the same time, thereby ensuring the transmission performance of a high-priority service data and avoiding the conflict of the grant-free transmission and the grant-based transmission.

Those of ordinary skill in the art may realize that the units and algorithm steps of each example described in combination with the embodiments disclosed herein can be implemented by electronic hardware, or a combination of computer software and electronic hardware. Whether these functions are performed in hardware or software depends on the specific application and design constraints of the technical solution. A person skilled in the art can use different methods to implement the described functions for each specific application, but such implementation should not be considered to be beyond the scope of the present disclosure.

Those skilled in the art can clearly understand that, for the convenience and brevity of description, the specific working processes of the systems, devices, and units described above can refer to the corresponding processes in the foregoing method embodiments, and are not repeated here.

In the embodiments of the present disclosure, it should be understood that the disclosed apparatus and method may be implemented in other ways. For example, the device embodiments described above are only schematic. For example, the division of the unit is only a logical function division. In actual implementation, there may be another division manner. For example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

The units described as separate components may or may not be physically separated, and the components displayed as units may or may not be physical units, that is, may be located in one place, or may be distributed on multiple network units. Some or all of the units may be selected according to actual needs to achieve the objective of the solution of this embodiment.

In addition, each functional unit in each embodiment of the present disclosure may be integrated into one processing unit, or each unit may exist separately physically, or two or more units may be integrated into one unit.

In the case that the functions are implemented in the form of software functional units and sold or used as independent products, they can be stored in a computer-readable storage medium. Based on this understanding, the technical solution of the present disclosure is essentially a part that contributes to the existing technology or a part of the technical solution can be embodied in the form of a software product. The computer software product is stored in a storage medium, including Several instructions are used to cause a computer device (which may be a personal computer, a server, or a network device, etc.) to perform all or part of the steps of the method described in various embodiments of the present disclosure. The foregoing storage medium includes various media that can store program codes, such as a U disk, a mobile hard disk, a ROM, a RAM, a magnetic disk, and an optical disk.

The above are only some embodiments of the present disclosure, but the scope of the present disclosure is not limited herein. Those skilled in the art may also make several improvements and replacements without departing from the principle of the present disclosure, which should be considered as the scope of the present disclosure. Therefore, the scope of the present disclosure shall be subject to the scope of the claims.

What is claimed is:

1. A terminal, comprising: a processor, a memory and a computer program stored in the memory and executable on the processor, wherein the computer program is executed by the processor to:
    in a case that both a grant-free resource and a grant-based resource are available for the terminal, choose to transmit service data on the grant-free resource preferentially; or
    in a case that both a grant-free resource and a grant-based resource are available for the terminal, choose to transmit service data on the grant-based resource preferentially; or
    in a case that both a grant-free resource and a grant-based resource are available for the terminal, choose dynamically to transmit service data on the grant-free resource and/or the grant-based resource;
    wherein the computer program is executed by the processor to:
    in the case that there is only one type of service data in a buffer of the terminal and the service data is capable of being transmitted on the grant-free resource, choose to transmit the service data on the grant-free resource; and/or
    in the case that there is only one type of service data in the buffer of the terminal and the service data is capable of being transmitted only on the grant-free resource, choose to transmit the service data on the grant-free resource; and/or
    in a case that at least two types of service data are in the buffer of the terminal, and the service data with a highest priority of the at least two types of service data is capable of being transmitted on the grant-free resource, choose to transmit the service data with the highest priority of the at least two types of service data on the grant-free resource, and drop or cancel a transmission of other service data;
    wherein the computer program is executed by the processor to:
    in a case that first service data and a retransmission data packet of the second service data scheduled by the uplink grant are in the buffer of the terminal, transmit the retransmission data packet of the second service data on the grant-free resource, and drop the transmission of the first service data;
    wherein the computer program is executed by the processor to:
    in the case that there is only one type of service data in a buffer of the terminal and the service data is capable of being transmitted on the grant-based resource, choose to transmit the service data on the grant-based resource; and/or
    in the case that there is only one type of service data in the buffer of the terminal and the service data is capable of being transmitted only on the grant-based resource, choose to transmit the service data on the grant-based resource; and/or
    in a case that at least two types of service data are in the buffer of the terminal, and the service data with a highest priority of the at least two types of service data is capable of being transmitted on the grant-based resource,
    choose to transmit the service data with the highest priority of the at least two types of service data on the grant-based resource, and drop or cancel a transmission of other service data, or
    reassemble the service data with the highest priority into a current data packet, and transmit a reassembled data packet on the grant-based resource;
    wherein the computer program is executed by the processor to:
    in a case that the first service data and a new data packet of the second service data scheduled by the uplink grant are in the buffer of the terminal and the priority of the first service data is higher than the priority of the second service data, transmit the first service data on the grant-based resource, and drop or cancel the transmission of the second service data; or reassemble the first service data and the second service data to obtain a reassembled data packet, and transmit the reassembled data packet on the grant-based resource;
    wherein the computer program is executed by the processor to:
    in a case that at least two types of service data are in the buffer of the terminal, determine the service data with a highest priority, select, according to a parameter of the service data with the highest priority, a transmission parameter of the grant-free resource and/or a transmission parameter of the grant-based resource, the grant-free resource and/or the grant-based resource matched with the service data with the highest priority, and transmit the service data with the highest priority on the selected grant-free resource and/or the grant-based resource;
    wherein the transmission parameter of the grant-free resource or the grant-based resource comprises any one or more of a modulation and coding scheme and a subcarrier spacing.

2. The terminal according to claim 1, wherein the computer program is executed by the processor to:
    in a case that the transmission of the second service data is not started, transmit the first service data on the grant-free resource, and drop the transmission of the second service data;
    and/or
    in a case that the transmission of the second service data is started, drop the transmission of the second service data, transmit the first service data on the grant-free resource and drop the transmission of the remaining second service data; or only drop the transmission of the second service data occupying a same time domain resource with the grant-free resource.

3. The terminal according to claim 1, wherein the computer program is executed by the processor to: in a case that the first service data and the second service data are reassembled, map a data block of the first service data to a resource adjacent to a reference signal.

4. The terminal according to claim 1, wherein the parameter of the service data comprises any one or more of a service type, a service priority, and a size of a data block of the service data.

5. The terminal according to claim 1, wherein the computer program is executed by the processor to:
in the case that at least two types of service data are in the buffer of the terminal and the terminal chooses to transmit the service data on the grant-free resource, transmit only the service data with the highest priority of the at least two types of service data on the grant-free resource, and drop or cancel a transmission of other service data;
and/or
in the case that at least two types of service data are in the buffer of the terminal and the terminal chooses to transmit the service data on the grant-based resource, transmit only the service data with the highest priority of the at least two types of service data on the grant-based resource, and drop or cancel a transmission of other service data; or reassemble the service data with the highest priority into a data packet, and transmit a reassembled data packet on the grant-based resource.

6. A non-transitory computer-readable storage medium, wherein a computer program is stored in the computer-readable storage medium, and the computer program is executed by a processor to perform:
in a case that both a grant-free resource and a grant-based resource are available for the terminal,
choosing to transmit service data on the grant-free resource preferentially; or
choosing to transmit service data on the grant-based resource preferentially; or
choosing dynamically to transmit service data on the grant-free resource and/or the grant-based resource;
wherein the computer program is executed by the processor to:
in the case that there is only one type of service data in a buffer of the terminal and the service data is capable of being transmitted on the grant-free resource, choose to transmit the service data on the grant-free resource; and/or
in the case that there is only one type of service data in the buffer of the terminal and the service data is capable of being transmitted only on the grant-free resource, choose to transmit the service data on the grant-free resource; and/or
in a case that at least two types of service data are in the buffer of the terminal, and the service data with a highest priority of the at least two types of service data is capable of being transmitted on the grant-free resource, choose to transmit the service data with the highest priority of the at least two types of service data on the grant-free resource, and drop or cancel a transmission of other service data;
wherein the computer program is executed by the processor to:
in a case that first service data and a retransmission data packet of the second service data scheduled by the uplink grant are in the buffer of the terminal, transmit the retransmission data packet of the second service data on the grant-free resource, and drop the transmission of the first service data;
wherein the computer program is executed by the processor to:
in the case that there is only one type of service data in a buffer of the terminal and the service data is capable of being transmitted on the grant-based resource, choose to transmit the service data on the grant-based resource; and/or
in the case that there is only one type of service data in the buffer of the terminal and the service data is capable of being transmitted only on the grant-based resource, choose to transmit the service data on the grant-based resource; and/or
in a case that at least two types of service data are in the buffer of the terminal, and the service data with a highest priority of the at least two types of service data is capable of being transmitted on the grant-based resource,
choose to transmit the service data with the highest priority of the at least two types of service data on the grant-based resource, and drop or cancel a transmission of other service data, or
reassemble the service data with the highest priority into a current data packet, and transmit a reassembled data packet on the grant-based resource;
wherein the computer program is executed by the processor to:
in a case that the first service data and a new data packet of the second service data scheduled by the uplink grant are in the buffer of the terminal and the priority of the first service data is higher than the priority of the second service data, transmit the first service data on the grant-based resource, and drop or cancel the transmission of the second service data; or reassemble the first service data and the second service data to obtain a reassembled data packet, and transmit the reassembled data packet on the grant-based resource;
wherein the computer program is executed by the processor to:
in a case that at least two types of service data are in the buffer of the terminal, determine the service data with a highest priority, select, according to a parameter of the service data with the highest priority, a transmission parameter of the grant-free resource and/or a transmission parameter of the grant-based resource, the grant-free resource and/or the grant-based resource matched with the service data with the highest priority, and transmit the service data with the highest priority on the selected grant-free resource and/or the grant-based resource;
wherein the transmission parameter of the grant-free resource or the grant-based resource comprises any one or more of a modulation and coding scheme and a subcarrier spacing.

7. The non-transitory computer-readable storage medium according to claim 6, wherein the computer program is executed by the processor to:
in a case that the transmission of the second service data is not started, transmit the first service data on the grant-free resource, and drop the transmission of the second service data;
and/or
in a case that the transmission of the second service data is started, drop the transmission of the second service data, transmit the first service data on the grant-free resource and drop the transmission of the remaining second service data; or only drop the transmission of the second service data occupying a same time domain resource with the grant-free resource.

8. The non-transitory computer-readable storage medium according to claim 6, wherein the computer program is executed by the processor to: in a case that the first service data and the second service data are reassembled, map a data block of the first service data to a resource adjacent to a reference signal.

9. The non-transitory computer-readable storage medium according to claim 6, wherein the parameter of the service data comprises any one or more of a service type, a service priority, and a size of a data block of the service data.

10. The non-transitory computer-readable storage medium according to claim 6, wherein the computer program is executed by the processor to:

in the case that at least two types of service data are in the buffer of the terminal and the terminal chooses to transmit the service data on the grant-free resource, transmit only the service data with the highest priority of the at least two types of service data on the grant-free resource, and drop or cancel a transmission of other service data;

and/or in the case that at least two types of service data are in the buffer of the terminal and the terminal chooses to transmit the service data on the grant-based resource, transmit only the service data with the highest priority of the at least two types of service data on the grant-based resource, and drop or cancel a transmission of other service data; or reassemble the service data with the highest priority into a data packet, and transmit a reassembled data packet on the grant-based resource.

* * * * *